(No Model.)  2 Sheets—Sheet 1.
J. M. HERDER.
COUPLING FOR HOSE OF AIR BRAKES.
No. 558,174. Patented Apr. 14, 1896.
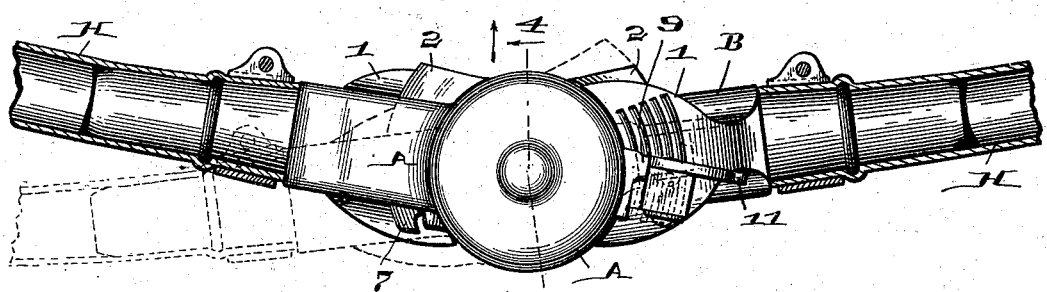
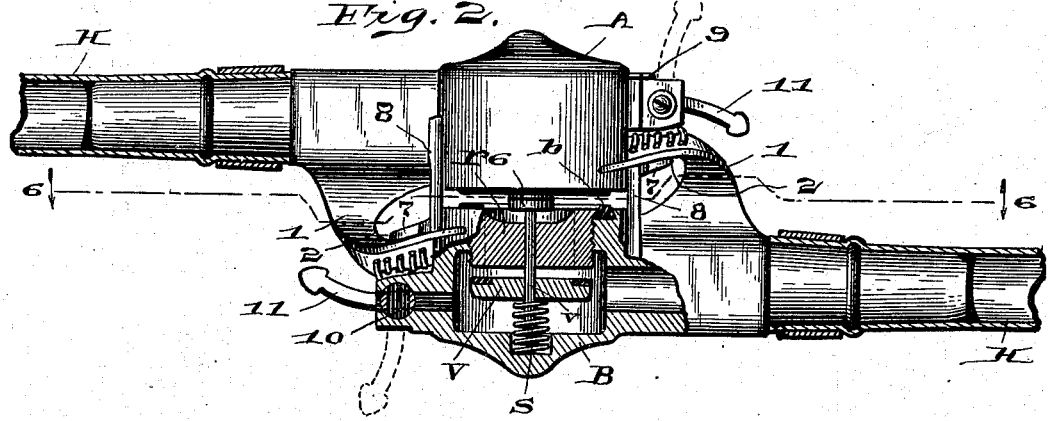
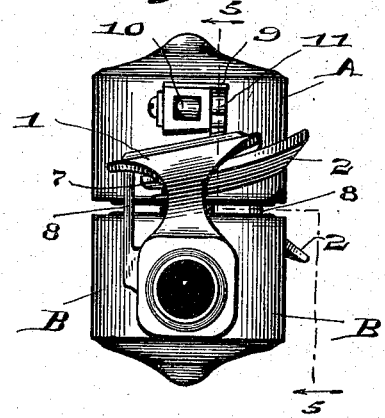
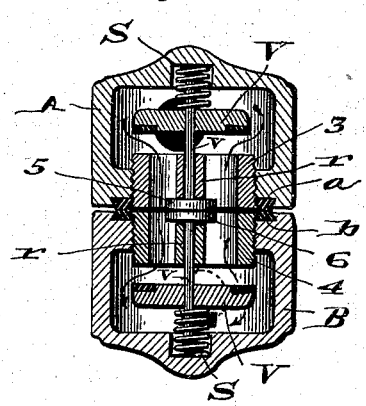
WITNESSES:  INVENTOR
H. S. Nealy.  John M. Herder,
J. A. Walsh.  BY Chester Bradford,
ATTORNEY.

(No Model.) 2 Sheets—Sheet 2.
J. M. HERDER.
COUPLING FOR HOSE OF AIR BRAKES.

No. 558,174. Patented Apr. 14, 1896.

WITNESSES: INVENTOR
John M. Herder
BY
Chester Bradford,
ATTORNEY.

UNITED STATES PATENT OFFICE.

JOHN M. HERDER, OF INDIANAPOLIS, INDIANA.

COUPLING FOR HOSE OF AIR-BRAKES.

SPECIFICATION forming part of Letters Patent No. 558,174, dated April 14, 1896.

Application filed June 6, 1895. Serial No. 551,928. (No model.)

*To all whom it may concern:*

Be it known that I, JOHN M. HERDER, a citizen of the United States, residing at Indianapolis, in the county of Marion and State of Indiana, have invented certain new and useful Improvements in Couplings for Hose of Air-Brakes, of which the following is a specification.

The object of my said invention is to produce a coupling for the hose or pipes used on cars as conduits for the air employed in the operation of air-brakes which shall possess elements of safety and automatic action, whereby various advantages are attained, particularly safety from collision between the rear section of a train which may be accidentally broken loose and the remainder of the train, all as will be hereinafter more particularly described and claimed.

Figure 5:
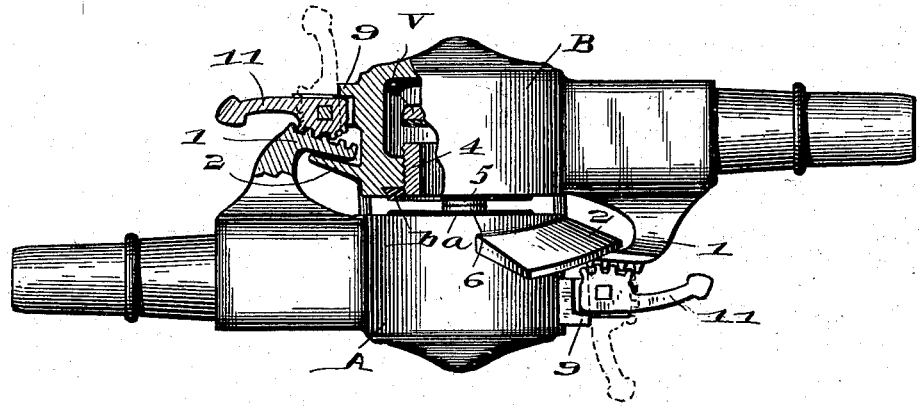
Figure 6:
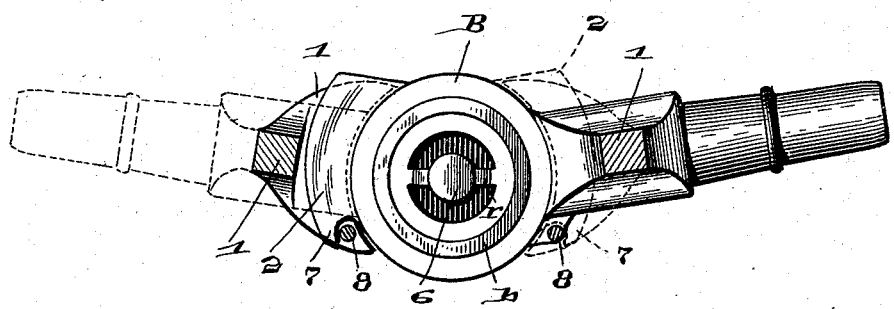
Figure 7:
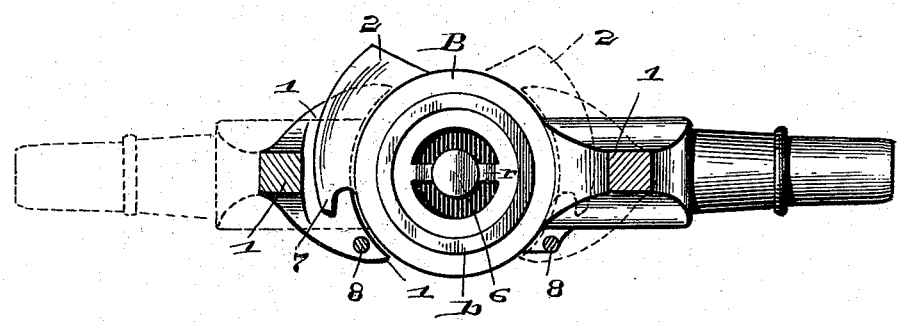

Referring to the accompanying drawings, which are made a part hereof, and on which similar letters and numerals of reference indicate similar parts, Figure 1 is a side elevation of one of my improved couplings (with sectional fragments of the hose connected thereto at each end) in the position it occupies when in use, with dotted lines at one end indicating the "straightened-out" position of the parts, or the situation thereof relatively to each other just before they become uncoupled under strain, as when a train breaks apart; Fig. 2, an under side plan view of the same in the said straightened-out position just before the parts are separated by the strain, one portion being broken into to show the interior and the positions of the petcock-levers after the parts are separated being shown by dotted lines; Fig. 3, an end elevation of the coupling complete (with the hose removed) in the same position as shown in Fig. 2; Fig. 4, a transverse sectional view through the central portion of the device when the parts are in the position shown by the full lines in Fig. 1; Fig. 5, a view as seen from the dotted line 5 5 in Fig. 3, the parts, however, being in the position shown by Figs. 2, 3, and 7; Fig. 6, a view as seen from the dotted line 6 6 in Fig. 2, the position of the parts being the same as in Figs. 1 and 4; and Fig. 7, a similar view to Fig. 6, except that the positions of the parts are the same as is illustrated in Figs. 2, 3, and 5.

This device is composed of the two main portions A and B, which are preferably castings, and which are substantially duplicates of each other, and each of these castings is provided with two curved wings 1 and 2, which engage with each other in the manner most clearly shown in Fig. 3, and are so positioned and arranged that when the parts are brought into the relation shown most plainly in Figs. 1 and 6 the faces of said parts A and B are brought into close contact with each other. In order to produce an air-tight joint these faces are preferably armed with rubber or other yielding contact-rings *a* and *b*, set into dovetailed grooves formed in the faces of the parts, or between them and interior bushings placed therein, as is shown most plainly in Fig. 4 and as will be presently more fully described. Within each of these parts A and B is formed a chamber, and from each of these chambers leads a pipe-like extension which is coupled by any usual means to the hose H. Within these chambers are valves V, and these are normally operated to seat themselves on valve-seats formed by the inner ends of the bushings 3 and 4 by springs S, placed within the chambers on the outer sides of the valves and surrounding the portions of the valve-stems *v* which extend out upon that side. These valves are also provided with soft-rubber rings or bushings, by which they are better enabled to make a perfectly air-tight joint. The valve-stems *v* also extend through beyond the faces of the valves and up through bearings in the cross-bars *r* in the bushings 3 and 4 and bear upon their outer ends heads 5 and 6, which are in contact with each other when the device is assembled. Said valve-stems *v* are so proportioned and arranged that when the parts are brought together the valves V are forced back, thereby compressing the springs and leaving a space between the valves and valve-seats, as most plainly shown in Fig. 4, through which the air in the pipes may freely circulate. The bushings 3 and 4 are inserted in the inner faces of the parts A and B, and, by means of cross-bars *r* therein, carry the valve-stems and valves. Said bushings are screw-threaded exteriorly (see especially Fig. 4) and can thus be inserted and removed without difficulty. As also shown most plainly in Fig. 4, they have slightly-overhanging edges at the extreme outer ends and thus form one side of the dovetailed grooves which contain the contact-rings $a$ and $b$.

As shown most plainly in Fig. 6, the parts are firmly locked together by means of the hook-points 7 and catch-bars 8 on the two parts, respectively, when said parts are all in their fully assembled position, as shown in Fig. 1 and in said Fig. 6. When, however, by the pull upon the hose or otherwise the parts are brought into line or straightened out, then these hooks and catch-bars are thrown out of engagement to the position shown in Fig. 7, so that a further pull upon the parts will separate them, said parts being separated laterally at the same time by the force of the springs S and the valves V being thereby and at the same time closed.

While to permit the air to escape upon the separation of sections of the train through an orifice of approximately the size of the conduit formed by the hose or pipes to which the coupling is attached would result disastrously, owing to the suddenness of the resultant braking operation or setting of the brakes, it is nevertheless necessary that a braking operation shall result from any accidental parting of the connection. I have therefore provided a petcock in each half of the apparatus, consisting, preferably, of a simple rotary valve 10, set across a suitable perforation leading to the outside from the corresponding chamber in the device, and provided with a lever or handle 11, by which it may be operated by hand when the other half of the apparatus is not connected thereto, and by suitable engaging devices, such as a rack and segment, adapted to be operated automatically upon such an accidental parting of the devices. The particular means I have devised for effecting this automatic operation consists in forming the end of each lever 11 segment-shaped, with spur-teeth thereon, and forming a suitable rack adapted to engage therewith on the outer surface of the wing 1 of the opposite half of the complete device.

As is shown in Fig. 1, the teeth of this rack on the wing 1 are of considerable length and are curved, so as to form arcs of circles struck from the center of the complete apparatus. The length of these rack-teeth is required in order that engagement shall be maintained in all positions of the parts when assembled, and the curved form is necessary, so that the position of the lever shall not be changed in assembling and disassembling the device. As will be readily understood, the lever is effectually locked when the parts are assembled by the engagement of the teeth thereof with those of the rack. A stop 9 (shown in Fig. 5) limits its movement in both directions, when it is freed by the disengagement of parts, so that it can be moved. Generally speaking, I regard the construction shown as a superior one. The gist of my invention in this particular, however, lies in such a connection of parts that the petcock will be opened upon any longitudinal pulling apart of the two halves of the apparatus by contact of one engaging point with another, and not upon the particular rack-and-segment formation of such engaging points shown, as other suitable construction may be substituted therefor without departing from my invention. When these parts are purposely disassembled, it is obvious that they may be swung to such a distance that the engagement between these portions will be entirely freed, and therefore the apparatus may be assembled and disassembled purposely, as desired, without disturbing the condition of these petcocks; but if the disassembling is effected by a longitudinal pull, either purposely or accidentally, such as will always result from the accidental breaking of a train, then these petcocks will infallibly be operated, with the result that the air will escape therefrom and the brakes be gradually set, not only upon the portion of the train which is attached to the engine and continues on its course, but also upon that portion which has been broken off or parted therefrom.

The petcock might be omitted from the forward half of the coupling (or that part of the coupling which is connected with the portion of the train which continues on its course) without departing from my invention and without incurring any liability of wrecking the train, although it is obviously of advantage to have the brakes on the section of train which continues on its course set, as well as those upon the section broken off from said train, so that the engineer and trainmen may know that an accident has occurred. As is well known, serious railroad accidents have frequently occurred because of a rear section, which had become accidentally broken off, running into the forward section after the latter had been stopped. By the use of my improved coupling such accidents are effectually precluded.

The operation of my device where a petcock is used upon each part is as follows: The two valves, having their various parts in proper position, are brought together, and the lower ends of the flanges or projections 2 on each of the two main portions of the structure are forced below or under the higher ends of the flanges or projections 1 of the opposite parts, and said main portions are then turned in relation to each other until they occupy the position shown in Figs. 1 and 6, when the faces are brought closely together, forming an air-tight joint, and the main valves are simultaneously opened, thus permitting a free passage of air through the structure from one pipe to the other. In this position the hook-points 8 engage over the catch-bars 9, and accidental separation is prevented until sufficient force is applied to straighten out the parts in relation to each other or bring them in line, when, as indicated in Fig. 6, these hooks and catch-bars are disengaged. The engaging points, as the racks on the outer sides of the wings 1 and toothed segments on the levers 11, are brought into engagement by the assembling operation, and, upon a continuation of the pull, after the parts are straightened out or brought in line, the said engagement will, as the main parts are pulled away from each other, open the petcocks, at the same time the springs S close the main valves B, so that a rapid escape of air is prevented, but a gradual escape is permitted. The petcock at the end of the train can be easily shut by hand, if desired, when the train has stopped, and it is therefore not necessary that a second coupling half shall be connected thereto to render this device operative, but it may, as will be readily understood, be made to form the termination of the air-brake system by simply closing the petcock, as above stated. The operation is not materially modified when but one petcock is used, but there is in that case no effect on the forward section of the broken train, which might continue uninterruptedly on its way.

Having thus fully described my said invention, what I claim as new, and desire to secure by Letters Patent, is—

1. The combination, in a coupling for air-brake hose or tubes, of the main parts provided with means for coupling them together, a petcock in one of said parts, and mechanism connecting the stem of said petcock with the other main part, whereby, upon forcible separation of said parts in an endwise direction, or in the direction of their straightened-out position, said petcock will be operated, substantially as set forth.

2. The combination, in a coupling for the hose or pipes of air-brakes, of the two main parts thereof, a petcock on one of said parts provided with a lever, a projection 9 on the same main part by which the movement of said lever is limited in both directions, and an engaging portion on the other main part by which said lever is operated as the two parts are pulled apart lengthwise, substantially as set forth.

3. The combination, in couplings for air-brake hose or tubes, of the main parts provided with engaging flanges, rack-bar surfaces on the outer ones of said flanges, petcocks in the ends of said main parts and communicating with the chambers thereof, the valves of said petcocks being provided with segment-shaped racks which engage with the rack-bars of the flanges, whereby, when said sections are separated by pulling the same endwise from each other, said petcocks will be opened, substantially as and for the purpose set forth.

In witness whereof I have hereunto set my hand and seal, at Indianapolis, Indiana, this 1st day of June, A. D. 1895.

JOHN M. HERDER. [L. S.]

Witnesses:
CHESTER BRADFORD,
JAMES A. WALSH.